(12) United States Patent
Thiel et al.

(10) Patent No.: US 8,984,332 B2
(45) Date of Patent: Mar. 17, 2015

(54) ACTIVE/PASSIVE DATABASE MANAGEMENT ACROSS CLUSTERS

(75) Inventors: Gregory Thiel, Black Diamond, WA (US); Yogesh Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 13/491,633

(22) Filed: Jun. 8, 2012

(65) Prior Publication Data

US 2013/0332770 A1 Dec. 12, 2013

(51) Int. Cl.
*G06F 11/00* (2006.01)

(52) U.S. Cl.
USPC .............................. 714/6.1; 714/15

(58) Field of Classification Search
USPC .......................................... 714/6.1
See application file for complete search history.

(56) References Cited

U.S. PATENT DOCUMENTS

| | | | |
|---|---|---|---|
| 7,370,064 B2 | 5/2008 | Yousefi'zadeh | |
| 7,392,421 B1 | 6/2008 | Bloomstein et al. | |
| 7,412,479 B2 | 8/2008 | Arendt et al. | |
| 7,539,898 B2 | 5/2009 | Highleyman et al. | |
| 7,908,514 B2 * | 3/2011 | Thiel et al. | 714/15 |
| 8,074,107 B2 | 12/2011 | Sivasubramanian et al. | |
| 2009/0063897 A1 * | 3/2009 | Highleyman et al. | 714/10 |
| 2009/0327519 A1 * | 12/2009 | Thiel et al. | 709/239 |
| 2009/0327805 A1 * | 12/2009 | Thiel et al. | 714/15 |
| 2012/0331336 A1 * | 12/2012 | Thiel et al. | 714/4.11 |

OTHER PUBLICATIONS

Taton, et al., "Self-Manageable Replicated Servers", Retrieved at <<http://hagimont.perso.enseeiht.fr/publications/wdiddr-jade-05.pdf>>, Proceedings of 31st Conference on Very Large Databases (VLDB 2005), Aug. 28, 2005, pp. 4.
"Managing Database Availability Groups", Retrieved at <<http://technet.microsoft.com/en-us/library/dd298065.aspx>>, Retrieved Date: Dec. 13, 2011, pp. 16.
"Windows Server Multi-site Clustering", Retrieved at <<http://www.acnc.com/media/pdf/36_f_WPD-Win_Server_Multi.pdf>>, Retrieved Date: Dec. 13, 2011, pp. 14.

* cited by examiner

*Primary Examiner* — Kamini Patel
(74) *Attorney, Agent, or Firm* — Louise Bowman; Jim Ross; Micky Minhas (57) ABSTRACT

A primary active manager can manage a first copy of a database in a first computer system cluster according to a set of management rules that provide for an active copy and one or more passive copies of the database at a given time. The primary active manager can also manage a second copy of the database in a second computer system cluster according to the rules. The rules can allow the first copy of the database or the second copy of the database to be the active copy if one or more criterion in the rules is met for that active copy. The first copy can be designated as the active copy and the second copy can be designated as a passive copy. A failure of the first copy can be detected, and in response, the second copy can be automatically designated as the active copy.

20 Claims, 5 Drawing Sheets

SOFTWARE 180 IMPLEMENTING ACTIVE/PASSIVE DATABASE MANAGEMENT ACROSS CLUSTERS

FIGRUE 5

ACTIVE/PASSIVE DATABASE MANAGEMENT ACROSS CLUSTERS

BACKGROUND

Replication of databases in computer clusters can provide a basis for data protection and service availability if the replicated copies remain in service and are available to become active when a failure should occur to another copy. Depending on the amount of redundancy in place and rate of failure, different system design parameters may be used. Costs can be reduced if the system is designed to repair itself, including the recovery from failed servers and disks.

One such system design is an active/passive replication system that uses a cluster as the scope for replication of databases. As used herein, a cluster is a group of computer systems that work together to provide one or more services so that the cluster can be viewed as a single system in one or more respects. In this active/passive design, a database is replicated to multiple copies in the cluster, with one copy being an active copy. An active copy is a copy to which access (e.g., reads and writes) is allowed. The active copy status is typically managed by a primary active manager (a role which may float between computing machines) within the cluster can determine which copy is active. Accordingly, if the active copy fails, the primary active manager can designate one of the other passive copies to be the active copy. However, such an active/passive replication system confronted with an additional cost impact. Specifically, the redundancy unit—the cluster—is designed with sufficient redundancy to automatically repair itself. This can further drive up the costs, especially because designers may assume the cluster redundancy unit fails at its worst rate.

SUMMARY

The tools and techniques discussed herein relate to replicated databases, and specifically to managing replicated active/passive databases that are spread across multiple clusters.

In one embodiment, the tools and techniques can include a primary active manager managing a first copy of a database in a first computer system cluster according to a set of management rules that provide for an active copy of the database and one or more passive copies of the database at a given time. The primary active manager can also manage a second copy of the database in a second computer system cluster according to the set of management rules. The management rules can allow the first copy of the database or the second copy of the database to be the active copy if one or more criterion in the set of management rules is met for that active copy.

In one example, the first copy can be designated as the active copy and the second copy can be designated as a passive copy of the database. A failure of the first copy can be detected, and in response, the second copy can be automatically designated as the active copy.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

FIG. 5 is a flowchart of yet another technique for active/passive database management across clusters.

DETAILED DESCRIPTION

Embodiments described herein are directed to techniques and tools for improved management of replicated active/passive databases spread across multiple clusters. Such improvements may result from the use of various techniques and tools separately or in combination.

Such techniques and tools may include a data protection and service availability system that uses active/passive replication and can use automatic sparing across multiple clusters. The clustering and active copy management support can be augmented to provide rapid repair times while still providing single-active-copy and rapid-failover features. Significant cost reductions can be achieved by sharing spare capacity across multiple clusters. For example, sparing calculations can provide a single cluster with minimal spare capacity and can assume that most of the spare capacity will come from the common shared spare pool. Negative impact of this federation of resources on failover and other recovery behaviors can be reduced. Each cluster can proxy operations to the federated cluster for its resources that are hosted in the federated cluster. For example, a primary active manager in a first cluster can manage multiple database copies in the first cluster. That primary active manager can also manage a database copy in a second cluster via a proxy in the second cluster (e.g., a second primary active manager in the second cluster that acts as a proxy). Thus, each cluster can still effectively manage the same number of replicated database copies, even though some of those copies may be located in one or more other clusters.

The availability and data protection systems can maintain their integrity if failure detection and recovery behaviors are proxied to the appropriate cluster control instance in the manner described above. Heart-beating can be provided between members of a cluster, so that a single cluster can pass health information between its own nodes (e.g., using heartbeat techniques). Using such heartbeat information, failures can be detected. For example, if a node does not receive heartbeat information from one of the nodes in the cluster for a period of time, the node can be considered to have failed. Such failure may be due to a server actually being inoperative (power failure, etc.), due to a communication line being inoperative, etc. If a cluster is hosting a database copy being managed by a primary active manager in another cluster, a proxy can forward the health information between the primary active manager in the other cluster and a node that is hosting the database copy. For example, the proxy could forward heartbeat information (which may be done by forwarding an indication of a lack of heartbeat information from a node that is hosting a database copy) to the controlling primary active manager in the other cluster.

The spare resource management functionality can be the similar in content to that provided to spare within a single cluster. However, the information describing a spare can be modified to represent and allow communication with a database copy from another cluster. For example, this may be done by sending messages and/or placing the configuration information in a common shared repository.

Accordingly, one or more substantial benefits can be realized from the tools and techniques described herein. For example, by allowing the deployment to share resources between multiple clusters, the incremental repair resources allocated to any specific cluster may be reduced. The resulting system can still operate similarly to an active/passive replicated system, and may have single-active (having only a single active copy at a time) and split brain protections of some such systems.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
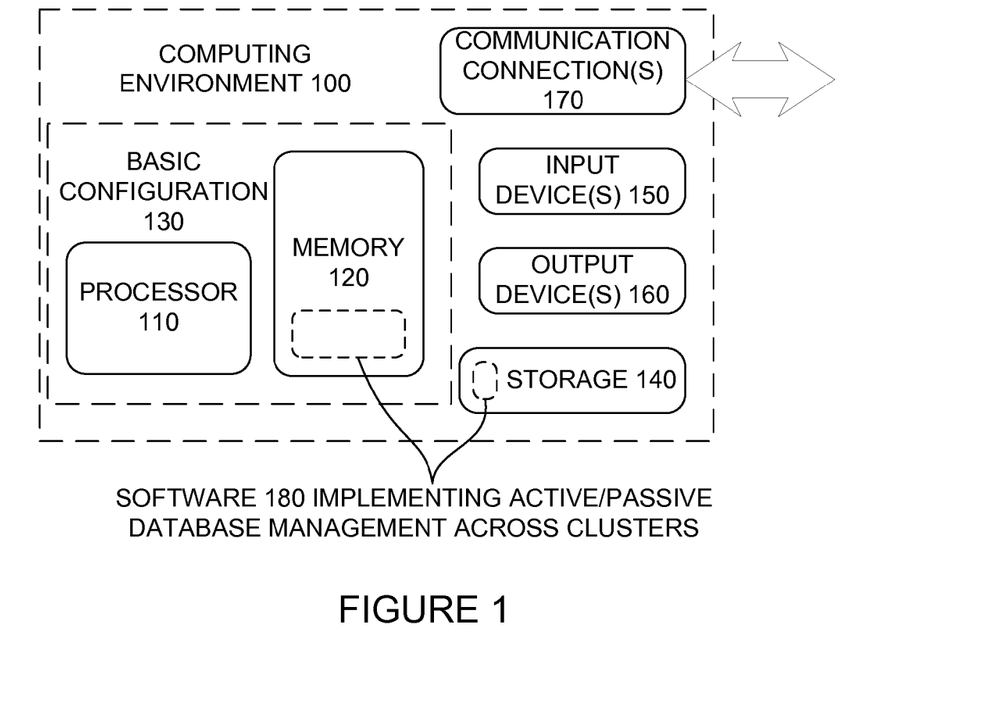
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a computer system or node in a computer system cluster. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing active/passive database management across clusters.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "manage," "designate," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
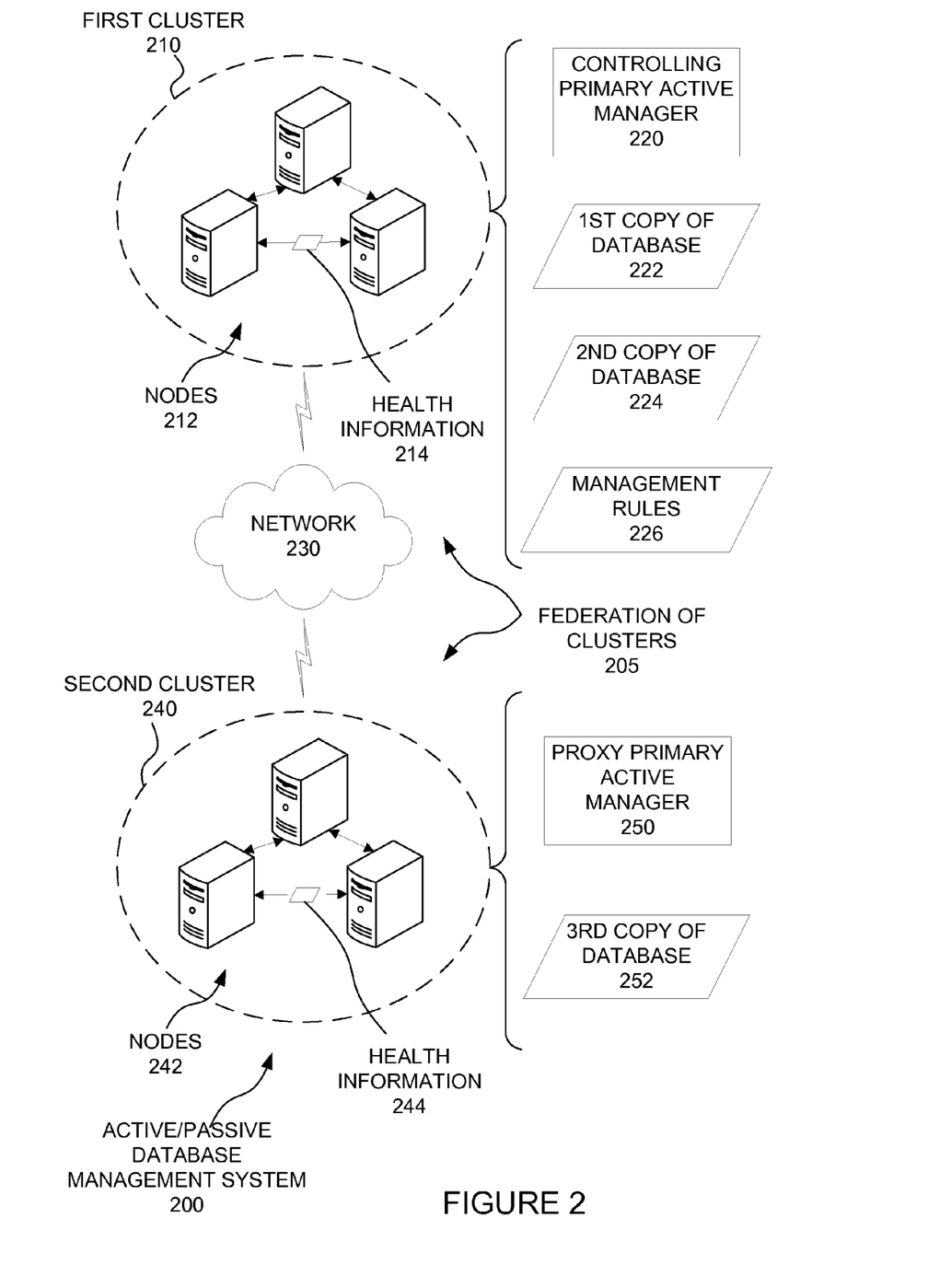
FIG. 2 is a schematic diagram of an active/passive database management system.

II. System and Environment for Active/Passive Database Management Across Clusters FIG. 2 is a schematic diagram of an active/passive database management system (200) in conjunction with which one or more of the described embodiments may be implemented. The system (200) can include a federation of clusters (205), which can include a first cluster (210). The first cluster (210) can include multiple nodes (212) that are connected to communicate with each other. The nodes (212) can work together to provide services so that the first cluster (210) may be viewed as a single computing system at least in some aspects. The nodes (212) can pass health information (214) between the nodes (212) so that a node (212) within the cluster (210) can determine the health of one or more other nodes (212) within the cluster (210). For example, the health information (214) may include heartbeat packets that are exchanged according to prescribed heart-beating techniques.

The first cluster (210) can host a controlling primary active manager (220) for a database. The controlling primary active manager role may be transferred between different nodes (212) in the first cluster (210). For example, such a transfer may occur if a current controlling primary active manager (220) becomes unhealthy so that it is unable to communicate with other nodes (212) in the first cluster (210). Additionally, a first copy of the database (222) can be stored and maintained on one of the nodes (212), and a second copy (224) can be stored and maintained on another one of the nodes (212). The copies (222 and 224) can be managed according to a set of management rules (226), which may be stored in the first cluster (210) or elsewhere. The management rules (226) may be used by the controlling primary active manager (220) to determine which of the copies (222 or 224) is the active copy at a particular time. For example, if the first copy (222) of the database is the active copy and the node (212) hosting the first copy (222) of the database becomes inaccessible, then the controlling primary active manager (220) can designate another copy of the database (e.g., the second copy (224)) as the active copy.

The active/passive database management system (200) can also include a network (230) that can connect the first cluster (210) to one or more other clusters. For example, the first cluster (210) can communicate over the network (230) with a second cluster (240) in the federation of clusters (205). For example, the second cluster (240) may be located in a different physical data center from the first cluster (210). The federation of clusters (205) may also include additional clusters, although only two are shown in FIG. 2 for the sake of simplicity. The second cluster (240) can operate similarly to the first cluster (210), including having nodes (242) that exchange health information (244), as discussed above. The second cluster may include a proxy primary active manager (250), which can act as a proxy for the controlling primary active manager (220) in managing copies of the database. Note that the first cluster (210) and/or the second cluster (240) may also store and manage other databases besides the database discussed herein. The proxy primary active manager (250) and/or the controlling primary active manager (220) may also be primary active manager(s) for one or more other database copies in the first cluster (210) and/or the second cluster (240).

The proxy primary active manager (250) can forward information, such as health information (244), between the node (242) that hosts the third copy (252) of the database in the second cluster (240) and the controlling primary active manager (220) in the first cluster (210). The third copy (252) of the database can be initialized in a manner similar to initialization of copies (222 and 224) of the database in the same cluster as the controlling primary active manager (220). For example, an existing copy (222 or 224) may act as a seed copy, with the data from the seed copy being copied over to the storage location for the new copy (e.g., for the third copy (252) of the database). After that copy procedure is complete, the new copy can be updated along with other copies (224) of the database. For example, log files may be played to the third copy (252) of the database starting from the point in time when the database was copied from the seed copy.

The third copy (252) of the database in the second cluster (240) can be managed according to the same management rules (226) as the other copies (222 and 224) of the database in the first cluster (210). Those management rules can be carried out by the proxy primary active manager (250) acting as a proxy to forward information between the controlling primary active manager (220) and the node (242) hosting the third copy (252) of the database.

Changes may be made to the active/passive database management system (200). For example, additional clusters could be included in the federation of clusters (205), additional database copies could be managed, etc.

III. Active/Passive Management Operation

Operation of the active/passive database management system (200) will now be discussed with reference to FIG. 2. As has been discussed, each cluster (210 or 240) can act as a database availability group, with the nodes of the cluster (210 or 240) working together as a group to host replicated databases to provide both data protection and service availability. When a failure occurs on a database copy (222, 224, or 252), the controlling primary active manager (220) can try to automatically repair it via local sparing, where additional resources in the first cluster (210) can be used to initiate and maintain another copy. Additionally, where the failed database copy (222, 224, or 252) is currently the active copy, the controlling primary active manager (220) can designate another local copy (222 or 224) as the new active copy. If the controlling primary active manager (220) determines that local resources in the first cluster (210) are insufficient, then the controlling primary active manager (220) may designate another cluster such as the second cluster (240) to initiate a new copy of the database. Also, if a copy is present on another cluster such as the second cluster (240), the controlling primary active manager (220) can designate that copy, such as the third copy (252) of the database, as the active copy. This may be done via a proxy, such as the proxy primary active manager (250). The proxy can forward information between the node hosting the third copy (252) of the database and the controlling primary active manager (220).

If a new copy of the database is to be initiated in the second cluster (240), the controlling primary active manager (220) can initiate a remote operation to allocate the spare on a cluster selected by the controlling primary active manager (220) or some other module. For example, the spare can be allocated on a selected server acting as a node (242) in the second cluster (240). When the spare selection is completed, then configuration information can be made available to the controlling primary active manager (220) and to the proxy primary active manager (250). Such configuration information can be used to track the copy's location and to manage the copy (e.g., to update the new copy when changes are made to the active copy, such as by playing log files to the new copy, to provide health information for the copy, etc.). Additionally, the proxy primary active manager (250) on the second cluster (240) can be informed that this copy is federated with another cluster.

Each primary active manager (220 and 250) can periodically check for the other manager (220 or 250) being active. When a failure is discovered, the controlling primary active manager (220) in the first cluster (210), which is the base cluster in this example, can initiate recovery operations according to the management rules (226). Copy selection and replication for the database may function according to the same management rules (226) that would be used if all the copies of the database were in the first cluster. If there is a failure of the third copy (252) of the database in the second cluster, the proxy primary active manager (250) can inform the controlling primary active manager (220) and allow the controlling primary active manager (220) to initiate and manage recovery operations according to the management rules (226).

The technique described above may be used to spare entire servers, or to spare one or more individual database copies. If entire servers with multiple disks are spared, due to controller issues, then multiple disks from a server may be spared, rather than a single disk, in the event of a failure.

IV. Techniques for Active/Passive Database Management Across Clusters

Several techniques for active/passive database management across clusters will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. Some or all of the acts discussed herein may be performed automatically, such as by a computer system like the active/passive database management system (200) discussed above.

Figure 3:
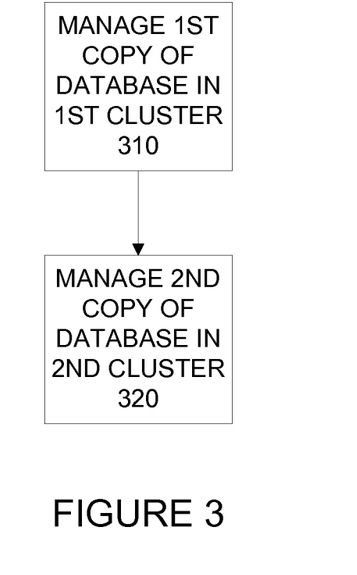
FIG. 3 is a flowchart of a technique for active/passive database management across clusters.

Referring to FIG. 3, a technique for active/passive database management across clusters will be described. The technique can include a primary active manager managing (310) a first copy of a database in a first computer system cluster according to a set of management rules that provide for an active copy of the database and one or more passive copies of the database at a given time. The set of management rules can allow the first copy of the database to be the active copy if one or more criterion in the set of management rules is met for the first copy. The technique can also include the primary active manager managing (320) a second copy of the database in a second computer cluster according to the set of management rules. The set of management rules can allow the second copy of the database to be the active copy if the one or more criterion in the set of management rules is met for the second copy.

The management rules can allow failing over to the first copy, failing over to the second copy, switching over to the first copy, switching over to the second copy, and/or combinations thereof. Also, the management rules can allow use of the first copy as a replication seed source, and the management rules may allow use of the second copy as a replication seed source. For example, the technique may include initiating the second copy using the first copy as a replication seed source.

The technique of FIG. 3 may also include designating the first copy as the active copy and designating the second copy as a passive copy of the database. A failure of the first copy may be detected, and in response to this detection the second copy can be automatically designated as the active copy.

The technique of FIG. 3 can include initiating the second copy. This initiation can include determining that insufficient resources are available to host the second copy in the first computer system cluster. The initiation can also include searching for sufficient resources within a federated cluster that includes the first and second computer system clusters, as well as identifying the second computer system cluster as having sufficient resources available to host the second copy. For example, the primary active manager could inquire of one or more remote clusters as to whether each has sufficient resources available to host the second copy. As an example, this could be done by sending a general inquiry as to what resources are available, or sending a specific inquiry that lists the needed resources and asks whether the remote cluster has such resources available.

The primary active manager can be in the first computer system cluster. Also, the primary active manager can be a first primary active manager in the first cluster. Managing the second copy can include managing via a second primary active manager in the second cluster that acts as a proxy for the first primary active manager in the first cluster. The primary active manager may receive health information for the first copy and for the second copy.

The technique of FIG. 3 can include replicating changes to the first copy in the second copy. Additionally, the primary active manager may be implemented at least in part in hardware logic.

Figure 4:
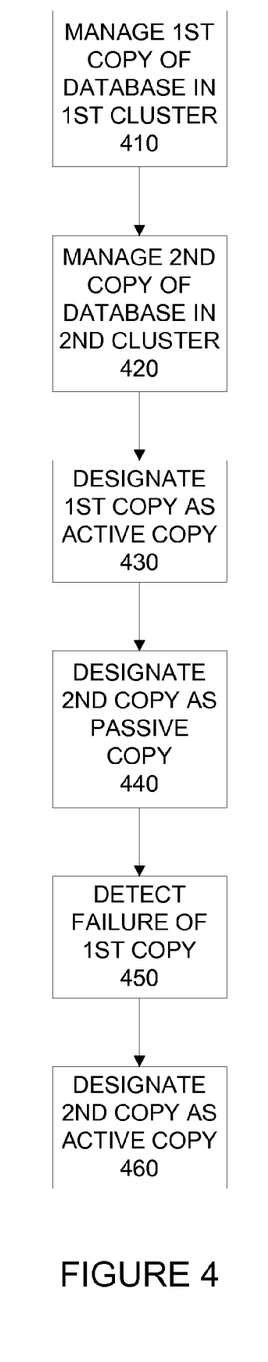
FIG. 4 is a flowchart of another technique for active/passive database management across clusters.

Referring now to FIG. 4, another technique for active/passive database management across clusters will be discussed. The technique can include managing (410) a first copy of a database in a first computer system cluster according to a set of management rules. The rules can provide for an active copy of the database and one or more passive copies of the database at a given time. The rules can allow the first copy of the database to be the active copy if one or more criterion in the set of management rules is met for the first copy. The technique can also include managing (420) a second copy of the database in a second computer system cluster according to the set of management rules. The set of management rules can allow the second copy of the database to be the active copy if the one or more criterion in the set of management rules is met for the second copy.

The technique can further include designating (430) the first copy as the active copy and designating (440) the second copy as a passive copy of the database. Additionally, the technique can include detecting (450) a failure of the first copy. In response to detecting the failure, the second copy can be automatically designated (460) as the active copy.

The management rules can allow failing over to the first copy, failing over to the second copy, switching over to the first copy, switching over to the second copy, use of the first copy as a replication seed source, use of the second copy as a replication seed source, and/or any combination thereof. The technique of FIG. 4 can additionally include initiating the second copy using the first copy as a replication seed source.

The FIG. 4 technique can also include initiating the second copy, which may include determining that insufficient resources are available to host the second copy in the first computer system cluster, searching for sufficient resources within a federated cluster that includes the first computer system cluster and the second computer system cluster, and identifying the second computer system cluster as having sufficient resources available to host the second copy.

The technique may also include a primary active manager in the first cluster receiving health information for the first copy and for the second copy. Additionally, managing the second copy can include replicating changes to the first copy in the second copy. The database may be a messaging storage database, such as an email storage database. Such a database may also include other information in addition to messaging information, such as calendaring and/or task information, etc. The first computer system cluster and the second computer system cluster can be located in different data centers.

Referring now to FIG. 5, yet another technique for active/passive database management across clusters will be discussed. The technique can include using (502) a first copy of a database in a first computer system cluster as a replication seed source to initiate a second copy of the database in a second computer system cluster. Initiating the second copy can include determining that insufficient resources are available to host the second copy in the first computer system cluster. Initiating the second copy can also include searching for sufficient resources within a federated cluster that includes the first and second computer system clusters. Initiating the second copy can further include identifying the second computer system cluster as having sufficient resources available to host the second copy.

A first primary active manager in the first computer system cluster can manage (510) the first copy of the database in the first computer system cluster according to a set of management rules that provide for an active copy of the database and one or more passive copies of the database at a given time. The set of management rules can allow the first copy of the database to be the active copy if one or more criterion in the set of management rules is met for the first copy.

The first primary active manager can manage (520) the second copy of the database via a second primary active manager in the second computer system cluster. The second primary active manager can act as a proxy for the first primary active manager. Managing (520) the second copy can be done according to the set of management rules. The set of management rules can allow the second copy of the database to be the active copy if the one or more criterion in the set of management rules is met for the second copy. The management rules can allow failing over to the second copy and/or switching over to the second copy. The technique can include designating (530) the first copy as the active copy and designating (540) the second copy as a passive copy of the database.

Changes to the first copy can be replicated (542) in the second copy, such as by keeping a log of changes and playing the logged changes to the second copy. The primary active manager can receive (544) health information for the first and second copies. A failure of the first copy can be detected (550), and in response, the second copy can automatically be designated (560) as the active copy in place of the first copy.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
 a controlling primary active manager managing a first copy of a database in a first computer system cluster according to a set of management rules that provide for an active copy of the database and one or more passive copies of the database at a given time, the set of management rules allowing the first copy of the database to be the active copy if one or more criterion in the set of management rules is met for the first copy, the first computer system cluster being a group of multiple computer systems that work together to provide one or more services so that the first computer system cluster acts as a single system in one or more respects; and the controlling primary active manager managing a second copy of the database in a second computer system cluster according to the set of management rules, the set of management rules allowing the second copy of the database to be the active copy if the one or more criterion in the set of management rules is met for the second copy, the second computer system cluster being a group of multiple computer systems that work together to provide one or more services so that the second computer system cluster acts as a single system in one or more respects, the second computer system cluster being separate from the first computer system cluster, and the managing of the second copy by the controlling primary active manager comprising managing the second copy via a proxy primary active manager in the second cluster that acts as a proxy for the controlling primary active manager in the first cluster.

2. The method of claim 1, wherein the management rules allow failing over to the first copy, failing over to the second copy, switching over to the first copy, and switching over to the second copy.

3. The method of claim 2, wherein the management rules allow use of the first copy as a replication seed source and use of the second copy as a replication seed source.

4. The method of claim 1, wherein the managing of the first and second copies comprises:
designating the first copy as the active copy and designating the second copy as a passive copy of the database;
detecting a failure of the first copy; and
in response to detecting the failure, automatically designating the second copy as the active copy.

5. The method of claim 1, further comprising initiating the second copy using the first copy as a replication seed source.

6. The method of claim 1, further comprising initiating the second copy, initiating the second copy comprising:
determining that insufficient resources are available to host the second copy in the first computer system cluster;
searching for sufficient resources within a federated cluster that comprises the first computer system cluster and the second computer system cluster; and
identifying the second computer system cluster as having sufficient resources available to host the second copy.

7. The method of claim 1, wherein the controlling primary active manager receives health information for the first copy and for the second copy.

8. The method of claim 1, further comprising making one or more changes to the first copy, wherein the management of the second copy comprises replicating the one or more changes in the second copy.

9. The method of claim 1, wherein the primary active manager is implemented at least in part in hardware logic.

10. A computer system comprising:
at least one processor; and
memory comprising instructions stored thereon that when executed by at least one processor cause at least one processor to perform acts comprising:
managing a first copy of a database in a first computer system cluster from a controlling primary active manager in the first computer system cluster according to a set of management rules that provide for an active copy of the database and one or more passive copies of the database at a given time, the set of management rules allowing the first copy of the database to be the active copy if one or more criterion in the set of management rules is met for the first copy, the first computer system cluster being a group of multiple computer systems that are configured to work together to provide one or more services so that the first computer system cluster is configured to act as a single system in one or more respects; and managing a second copy of the database in a second computer system cluster from the controlling primary active manager according to the set of management rules, the set of management rules allowing the second copy of the database to be the active copy if the one or more criterion in the set of management rules is met for the second copy, the second computer system cluster being a group of multiple computer systems that are configured to work together to provide one or more services so that the second computer system cluster is configured to act as a single computer system in one or more respects, and the second computer system cluster being different from the first computer system cluster, and the managing of the second copy from the controlling primary active manager comprising managing the second copy via a proxy primary active manager in the second cluster that acts as a proxy for the controlling primary active manager in the first cluster;

wherein the managing of the first and second copies comprises:
designating the first copy as the active copy and designating the second copy as a passive copy of the database;
detecting a failure of the first copy; and
in response to detecting the failure, automatically designating the second copy as the active copy.

11. The computer system of claim 10, wherein the management rules allow failing over to the first copy, failing over to the second copy, switching over to the first copy, switching over to the second copy, use of the first copy as a replication seed source, and use of the second copy as a replication seed source.

12. The computer system of claim 10, wherein the acts further comprise initiating the second copy using the first copy as a replication seed source.

13. The computer system of claim 10, wherein the acts further comprise initiating the second copy, initiating the second copy comprising:
determining that insufficient resources are available to host the second copy in the first computer system cluster;
searching for sufficient resources within a federated cluster that comprises the first computer system cluster and the second computer system cluster; and
identifying the second computer system cluster as having sufficient resources available to host the second copy.

14. The computer system of claim 10, wherein the management of the first copy comprises the controlling primary active manager in the first cluster receiving health information for the first copy and the management of the second copy comprises the controlling primary active manager in the first cluster receiving health information for the second copy.

15. The computer system of claim 10, wherein the acts comprise making one or more changes to the first copy, and wherein managing the second copy comprises replicating the one or more changes in the second copy.

16. The computer system of claim 10, wherein the database is a messaging storage database.

17. The computer system of claim 10, wherein the first computer system cluster and the second computer system cluster are located in different data centers.

18. One or more computer-readable storage media having computer-executable instructions embodied thereon that, when executed by at least one processor, cause at least one processor to perform acts comprising:

a first primary active manager in a first computer system cluster managing a first copy of a database in the first computer system cluster according to a set of management rules that provide for an active copy of the database and one or more passive copies of the database at a given time, the set of management rules allowing the first copy of the database to be the active copy if one or more criterion in the set of management rules is met for the first copy, the first computer system cluster being a group of multiple computer systems that are configured to work together to provide one or more services so that the first computer system cluster is configured to act as a single system in one or more respects; and     the first primary active manager managing a second copy of the database via a second primary active manager in a second computer system cluster acting as a proxy for the first primary active manager, managing the second copy being done according to the set of management rules, the set of management rules allowing the second copy of the database to be the active copy if the one or more criterion in the set of management rules is met for the second copy, the second computer system cluster being a group of multiple computer systems that are configured to work together to provide one or more services so that the second computer system cluster is configured to act as a single system in one or more respects, and the managing of the second copy by the first primary active manager comprising managing the second copy via a proxy primary active manager in the second computer system cluster that acts as a proxy for the first primary active manager in the first computer system cluster.

19. The one or more computer-readable storage media of claim 18, wherein the managing of the first and second copies comprises:

designating the first copy as the active copy and designating the second copy as a passive copy of the database;

detecting a failure of the first copy; and in response to detecting the failure, automatically designating the second copy as the active copy.

20. The one or more computer-readable storage media of claim 18, wherein the acts comprise the primary active manager receiving health information for the first copy and for the second copy.

* * * * *